United States Patent [19]
Ueno et al.

[11] Patent Number: 5,460,081
[45] Date of Patent: Oct. 24, 1995

[54] CENTER-ALIGNING APPARATUS FOR CROISSANT DOUGH PIECES

[75] Inventors: Sadao Ueno; Hitoshi Kuwahara; Michio Morikawa, all of Utsunomiya, Japan

[73] Assignee: Rheon Automatic Machinery Co., Ltd., Tochigi, Japan

[21] Appl. No.: 319,259

[22] Filed: Oct. 6, 1994

[30] Foreign Application Priority Data

Oct. 8, 1993 [JP] Japan ................................ 5-277583

[51] Int. Cl.⁶ .......................... A21C 3/06; A21C 11/00; A23P 1/00
[52] U.S. Cl. .................... 99/450.2; 99/353; 99/450.1; 425/321; 425/335
[58] Field of Search ................. 99/450.1, 450.2, 99/450.6, 353; 425/112, 115, 321, 334, 335, 371, 372, 391, 162; 426/500–503, 512, 496

[56] References Cited

U.S. PATENT DOCUMENTS

| | | | |
|---|---|---|---|
| 4,741,263 | 5/1988 | Ueno et al. | 99/450.2 |
| 4,905,583 | 3/1990 | Hayashi | 99/450.2 |
| 4,996,915 | 3/1991 | Morikawa et al. | 99/450.2 |
| 5,018,439 | 5/1991 | Bordin | 99/450.2 |
| 5,078,585 | 1/1992 | Morikawa et al. | 425/321 X |
| 5,142,956 | 9/1992 | Ueno et al. | 99/450.1 |
| 5,169,664 | 12/1992 | Ueno et al. | 426/503 |

*Primary Examiner*—Timothy F. Simone
*Attorney, Agent, or Firm*—Limbach & Limbach; W. Patrick Bengtsson

[57] ABSTRACT

The present invention provides a center-aligning apparatus for fusiform bread dough pieces such as rolled-up croissant dough pieces. In this invention an upstream conveyor and a downstream conveyor located below and adjacent the upstream conveyor are provided. Between the two conveyors and adjacent the upstream conveyor, a pair of concave rollers is arranged. The rolled-up dough piece from the upstream conveyor is deposited on the concave rollers to have its center aligned with the gap between the rollers. Also, a pair of shutters is mounted below the concave rollers to stably deposit the dough piece on the downstream conveyor. This invention enables the dough piece to advance in alignment with the control line of the downstream conveyor.

7 Claims, 3 Drawing Sheets

CENTER-ALIGNING APPARATUS FOR CROISSANT DOUGH PIECES

[DETAILED DESCRIPTION OF THE INVENTION]

1. Industrial Field of the Invention

This invention relates to the center-aligning art of fusiform bread dough pieces, such as rolled-up croissant dough pieces. It has been difficult to align with the conveyor or a folding device croissant dough pieces while the dough pieces are conveyed, since the central portion of the dough piece is thicker than the remaining portions. This invention provides a center-aligning apparatus located at the upstream part of an apparatus for folding the croissant dough pieces.

2. Prior Art

Conventional croissants are generally bent or curved at their central portions, and to obtain the products of such a shape many forming apparatuses have been developed in the past, such as shown in Netherlands Patent Application No. 8800402 and German Patent Application No. P4039793.9.

[PROBLEMS TO BE SOLVED BY THE INVENTION]

According to the prior art, it is not easy to bend the croissant dough piece at its center. To do so a preceding or preliminary operation is required. The present invention provides a center-aligning apparatus for the croissant dough piece in preparation for the bending thereof.

[THE MEANS TO RESOLVE THE PROBLEMS]

In the present invention the center of the croissant dough piece can be correctly aligned with the subsequent bending device while the dough is being conveyed on a conveyor. Namely, this invention provides a center-aligning apparatus for croissant dough pieces comprising a pair of concave rollers located between an upstream conveyor that conveys rolled-up croissant dough pieces and a downstream conveyor positioned below and downstream of the upstream conveyor, the rollers being rotated in the same direction as that of the movement of the upstream conveyor, and being provided with a gap between the pair of rollers being adjustable so that it becomes wider or narrower.

Further, the present invention provides a center-aligning apparatus for croissant dough pieces comprising a pair of concave rollers located between an upstream conveyor that conveys rolled-up croissant dough pieces and a downstream conveyor positioned below and downstream of the upstream conveyor, the rollers being rotated in the same direction as that of the movement of the upstream conveyor, the rollers being provided with a gap therebetween. The gap between the rollers are adjustable. The apparatus further comprises a pair of planar shutters below and adjacent the pair of concave rollers, and adapted to opened and closed the free longitudinal edge of each of the shutters being inclined downwardly and inwardly when the shutters are closed.

In one embodiment of the present invention, the apparatus is provided with a sensor adjacent the downstream end of the upstream conveyor to detect the passage of the croissant dough pieces, and the central gap between the concave rollers is made to become wider or narrower based on the signals from the sensor. Also the planar shutters are made to be opened or closed based on the signals as the sensor detects the passage of the dough pieces.

[EMBODIMENT]

Figure 1:
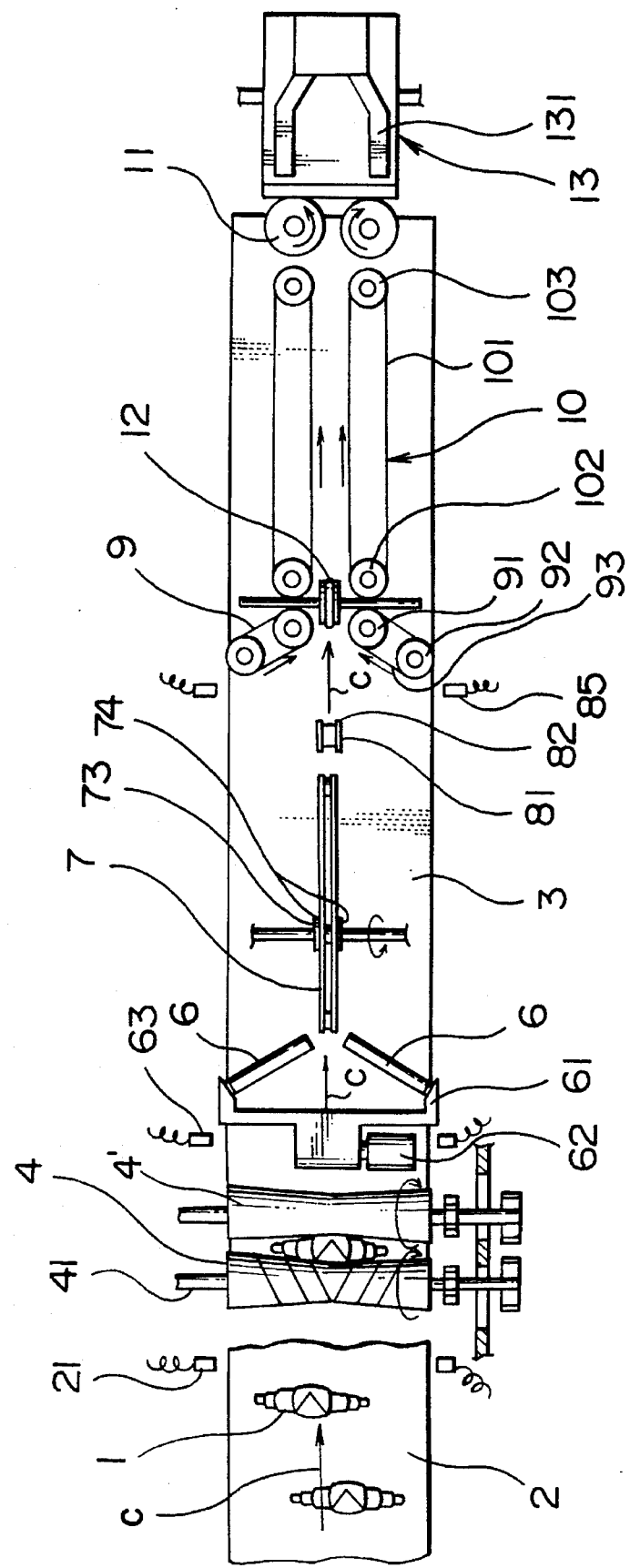
FIG. 1 is an overall plan view of a croissant dough folding machine that includes the center-aligning apparatus for croissant dough pieces of the present invention.
Figure 2:
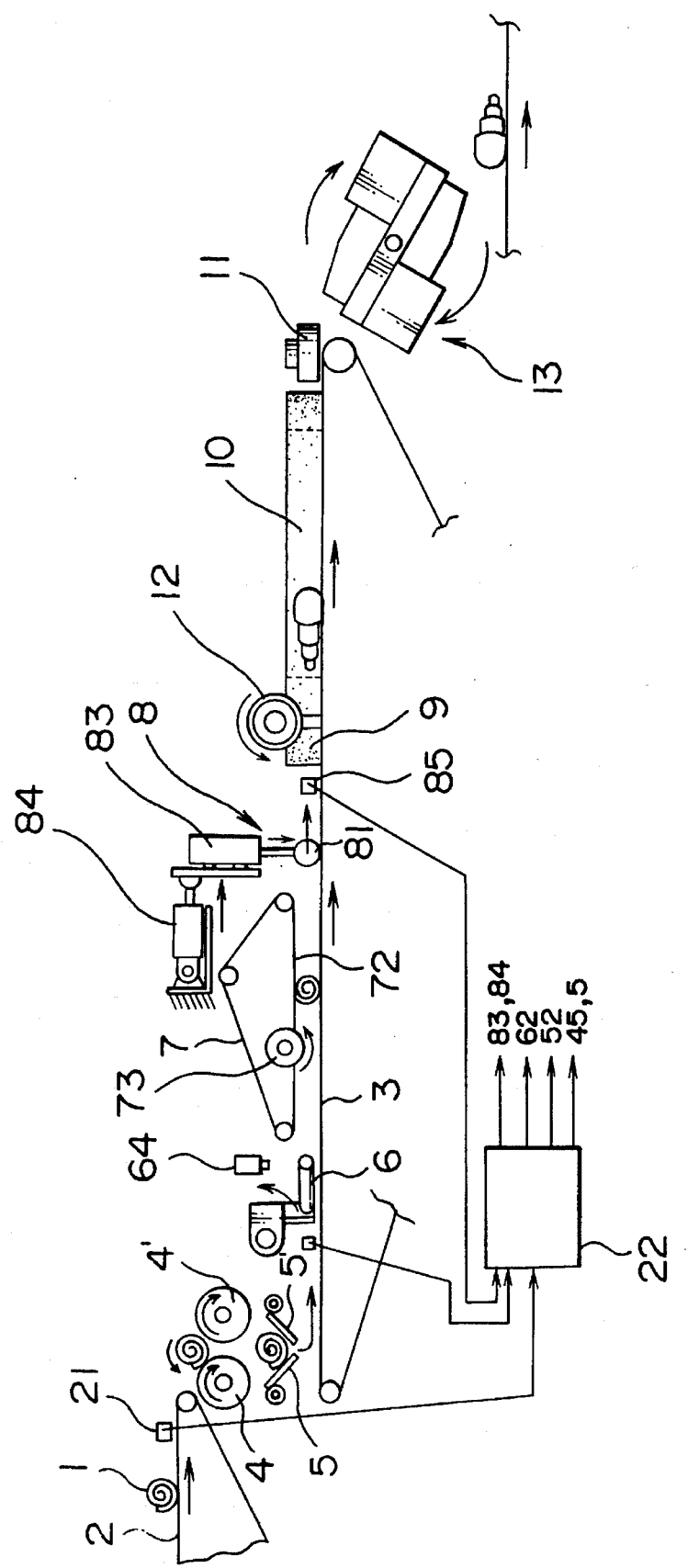
FIG. 2 is an overall side view of the machine shown in FIG. 1.
Figure 3:
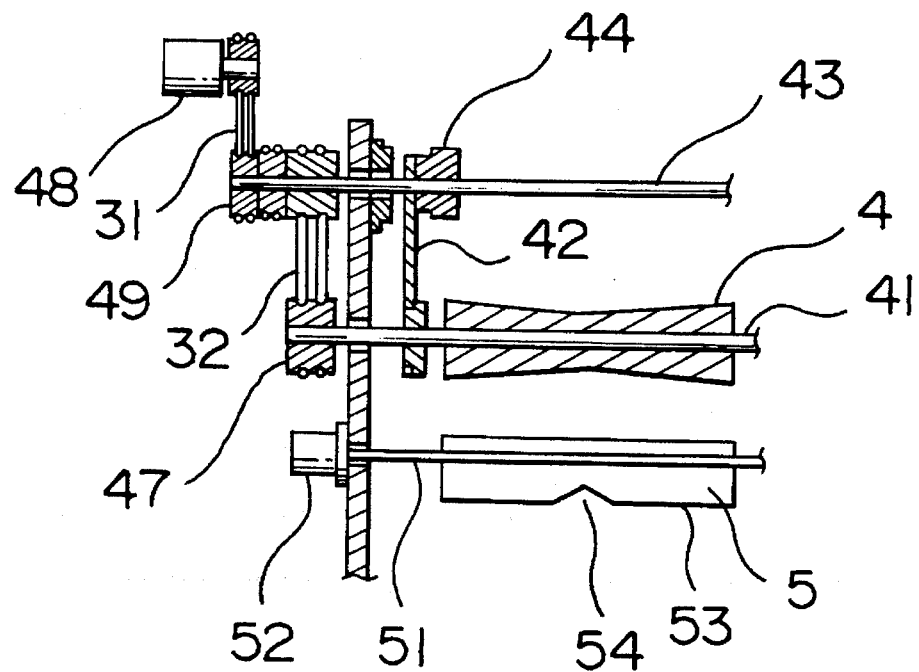
FIG. 3 is a front sectional view of the center-aligning apparatus of the present invention.
Figure 4:
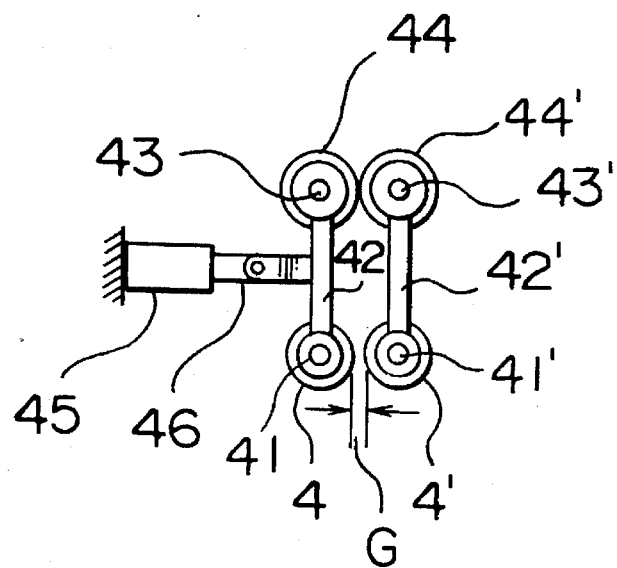
FIG. 4 is a partial side view of the apparatus of FIG. 3.

An embodiment of the present invention will now be described. The center-aligning apparatus for croissant dough pieces comprises an upstream conveyor 2 to convey rolled-up croissant dough pieces 1 and a downstream conveyor 3 located downstream of and below the upstream conveyor 2.

A pair of concave rollers 4, 4' are located adjacent the upstream conveyor 2 and between the upstream conveyor 2 and the downstream conveyor 3. The concave rollers 4, 4' are positioned side by side with their axes positioned horizontally and laterally to the direction of movement of the conveyors. The diameter of each of the rollers 4, 4' is made to be smaller at the central portion, so that gap G is formed between the rollers.

The concave rollers 4, 4' are fixed to roller shafts 41, and the roller shafts are supported by arms 42, 42', which in turn are supported by intermediate shafts 43, 43'. Both the roller shafts 41, 41' and the intermediate shafts 43, 43' are oppositely disposed.

Similarly, the rollers 4, 4' are oppositely located, each being fixed to one of the roller shafts 41, 41'.

The intermediate shafts 43, 43' have gears 44 and 44', which mesh with each other.

The arm 42 is connected to a rod 46 of an air cylinder 45, so that when the air cylinder is operated to pull the arm 42, the other arm 42' is swung by the gears 44, 44' in the opposite direction about the intermediate shaft 43', thereby to widen the gap G between the concave rollers 4, 4'. A pulley 47 is fixed to the end of the roller shaft 41, and the roller shaft 41 of the concave roller and the drive shaft of a motor 48 are connected by belts 31, 32 via a pulley 49 fixed to the intermediate shaft 43.

A pair of opposite planar shutters 5, 5' is provided below and adjacent the concave rollers 4, 4'. They are adapted to be opened and closed, and the free longitudinal edge 53 of each of the shutters is inclined downwardly and inwardly when the shettes are closed. An actuator 52 is mounted on a frame and about the swing shaft 51 of one of the shutters 5, 5'. One end of each of the swing shafts 51 is connected to each other by gears (not shown). Thus when the actuator 52 is actuated, the shutters rotate about swing shafts 51 to widen the space between the free edges 53. The central portion of the free edge of each shutter is formed with a V-shaped cut-out 54. A pair of freely-rotatable inclined rollers 6 is positioned on the downstream conveyor 3. The downstream ends of the inclined rollers 6 are inclined toward each other and the inclined rollers 6 and the conveying surface of the downstream conveyor 3 are positioned parallel to each other.

Dough-piece holding belts 7 are provided adjacent and downstream of the inclined rollers 6. The dough-piece holding belts 7 consist of two thin endless belts, which are trained in parallel relationship. The speed of the dough-piece holding belts 7 is the same as the conveying speed of the conveyor 3.

The dough-piece bending apparatus of the present invention comprises, in addition to the conveyor 3, a dough-piece bending member 8 and a pair of doughpiece bending belts 9. The bending member 8 includes a roller 81 having flanges 82 at each side of it, an air cylinder 83 for lowering the roller 81 toward the conveyor, and an air cylinder 84 for moving the frame that supports the air cylinder 83 in the same direction as that of the movement of the conveyor 3. A photoelectric tube 85 is provided to sense the passage of the croissant dough piece 1.

In this structure, when the roller 81 receives a signal from the photoelectric tube 85, the roller 81 pushes the croissant dough piece 1 in the direction of its movement into the space between bending belts 9, which are located downstream of the roller 81.

The bending belts 9 consist of endless belts 93 each trained around a drive roller 91 and an idler roller 92.

The belts 9 are positioned on the conveyor 3 so that they converge in the downstream direction and they are adapted to swing toward and away from each other. Namely, each of the outer portions of the endless belts 93 that is normally positioned adjacent the longitudinal edge of the conveyor 3 can rotate about the shaft of the drive roller 91 inwardly toward the central line C of the conveyor 3.

[FUNCTION]

The function of the present invention will now be explained. A croissant dough piece 1 that was rolled up by a conventional rolling-up device is conveyed along the upstream conveyor 2. The croissant dough piece 1 is then delivered from the upstream conveyor to the gap G between the concave rollers 4, 4'. At this point, since the rollers 4, 4' are adjacent each other, this gap G is small. The rollers rotate in the same direction. Thus the dough piece is forced to be rotated to move toward the central portion of the rollers. Therefore, even if the central portion of the croissant dough piece 1 is not aligned with the central moving line C of the conveyor, the dough piece is rotated so that the central thick portion of the dough piece and the gap G, the central wide space, between the rollers 4, 4' are aligned. Thus the central moving line C of the conveyor and the center of the dough piece 1 are eventually aligned.

Thereafter, the gap G between the rollers 4, 4' is widened, causing the croissant dough piece 1 to fall into the shutters 5.

The shutters serve to stop the rotation of the croissant dough piece 1 and deposit it onto the downstream conveyor 3. Since the shutters are formed with cut-outs 54, the thick central portion of the dough piece 1 is snugly positioned on the cut-outs 54 when the dough piece falls into the shutters 5. Thus the dough piece is held stable in the shutters. Thereafter the shutters are opened to deposit the croissant dough piece stably on the downstream conveyor 3.

Therefore, the dough piece 1, the center of which has been aligned by the concave rollers 4, 4', can be correctly deposited on the downstream conveyor 3, when the rollers and shutters are opened. Namely, the center of the fusiform dough piece can be precisely aligned with the center line C of the downstream conveyor 3.

A control panel 22 is provided on a frame (not shown). The control panel has a sequencer and controls the operational sequence of the concave rollers 4, 4' and the shutters 5, 5', as follows:

1) The sensor 21 senses the passage of the croissant dough piece 1 and transmits the signal to the control panel 22.

2) After a lapse of a predetermined time following the dough piece 1 is so sensed, the small gap G between the concave rollers 4, 4' is made to become greater and soon again smaller by the signal from the control panel 22.

3) The shutters 5 are opened and soon again closed by the signal from the control panel 22.

Since this operational sequence is correctly controlled by a sequencer, etc., the center alignment of the croissant dough piece can be precisely carried out regardless of whether the dough is regularly supplied or not.

Although in this embodiment the height of the rollers 4, 4' is the same, it need not be the same. For instance, the height of the downstream roller 4' could be made slightly higher than that of the upstream roller 4, depending on the moving speed or the size of the dough piece. Thus the height of the rollers can be adjusted as desired. By so adjusting, the dough piece can be prevented from dropping off the rollers when it is rotated.

Also, the tapering angle of the concave portion of each roller can be determined depending on the shape or thickness of the dough piece. If the central portion of the croissant dough piece is thick, it is of course preferable to give the rollers a larger tapering angle, so that the gap G can become larger. Similarly, when the central portion is thin, the tapering angle should be lessened.

Further, the speed of the rotation of each concave roller is adjusted based on the elasticity of the dough or on how smoothly the center of the dough piece moves to the center line C of the conveyor. In this embodiment a good result was obtained when the rotational speed of the upstream roller was set at 40 m/min and that of the downstream roller 80 m/min, respectively. Of course, other speeds may be chosen with good results.

The rollers, in this embodiment, are made of polyacetal and the upstream roller is formed with spiral grooves to help move the dough piece toward the center of the rollers when they are rotated.

The dough piece 1 deposited on the downstream conveyor 3 is then received by the inclined rollers 6. Thereafter the dough piece receives further processing in the subsequent operation lines. The processing includes detection of the rolled-up end of the dough piece by a laser sensor to place the dough piece in a predetermined orientation, and further bending it at its center.

[EFFECT OF THE INVENTION]

As explained above, in the present invention the rolled-up croissant dough piece is rotated and aligned with a central position by a pair of rotating concave rollers. After the gap between the concave rollers is widened, the dough piece is conveyed downstream along the control line on the conveyor.

Also, a pair of shutters is provided below and adjacent the concave rollers. The shutters can open and close with their free edges inclined downwardly and inwardly. Thus the croissant dough piece can be stably deposited on the downstream conveyor and is carried downstream.

Further, since a cut-out is formed in each shutter, the shutters can receive the dough piece in a desired position, causing the dough piece to be precisely deposited on the downstream conveyor.

Also, since the operations to widen and narrow the gaps of the concave rollers and the shutters are carried out by the signals from the sensor located adjacent the downstream end of the upstream conveyor, the center aligning operation of the croissant dough piece can be performed regardless of whether the dough pieces are regularly supplied or not.

As is clear from the above, even if the conveying direction or the orientation of the dough piece is not fixed, or even if the distance between the adjacent croissant dough pieces is not uniform, the center of the dough pieces can be aligned with the central line on the downstream conveyor. Thus the dough pieces can be conveyed downstream in an orderly manner, enabling them to be correctly processed in subsequent lines. By this invention it has become possible to provide products of higher quality with higher productivity, compared to those produced by the conventional art.

What is claimed is:

1. A center-aligning apparatus for croissant dough pieces comprising a pair of concave rollers located between an upstream conveyor that conveys rolled-up croissant dough pieces and a downstream conveyor positioned below and downstream of the upstream conveyor, the diameter of each of the rollers progressively decreasing in the axial direction from its ends toward its central portion, the rollers being positioned horizontally in parallel with the conveying surface of the downstream conveyor, and the rollers being provided with a gap therebetween and rotated in the same direction as that of the movement of the upstream conveyor.

2. An apparatus according to claim 1, wherein the gap between the pair of rollers is adjustable.

3. An apparatus according to claim 1, wherein the apparatus further comprises a pair of spaced-apart planar shutters below and adjacent the pair of concave rollers and adapted to be opened and closed, the free longitudinal edge of each of the shutters being inclined downwardly and inwardly when the shutters are closed.

4. An apparatus according to claim 3, wherein the free longitudinal edge of each of the shutters has a cut-out at its central portion.

5. An apparatus according to claim 3, wherein the gap between the pair of rollers is adjustable.

6. An apparatus according to claim 1, wherein a sensor is provided adjacent the downstream end of the upstream conveyor to detect the passage of the croissant dough pieces on the upstream conveyor, the sensor being adapted to provide signals, and the gap between the concave rollers are made to become wider or narrower based on signals from the sensor.

7. An apparatus according to claim 3, wherein a sensor is provided adjacent the downstream end of the upstream conveyor to detect the approaching dough pieces and to send signals so as to open and close the planar shutters.

* * * * *